(12) United States Patent
Harouni et al.

(10) Patent No.: US 11,767,895 B2
(45) Date of Patent: Sep. 26, 2023

(54) BRAKE DISC ASSEMBLY WITH SEGMENTS

(71) Applicant: ALSTOM Transport Technologies, Saint-Ouen-sur-Seine (FR)

(72) Inventors: Mohammed Harouni, Magny les Hameaux (FR); Lionel Valette, Le Creusot (FR); Ruddy Mann, Saint Martin du Tartre (FR); Philippe Davion, Sens (FR); Jean-Jacques Kakanoukili, Sens (FR)

(73) Assignee: ALSTOM Transport Technologies, Saint-Ouen-sur-Seine (FR)

( * ) Notice: Subject to any disclaimer, the term of this patent is extended or adjusted under 35 U.S.C. 154(b) by 0 days.

(21) Appl. No.: 17/305,860

(22) Filed: Jul. 15, 2021

(65) Prior Publication Data

US 2022/0018411 A1 Jan. 20, 2022

(30) Foreign Application Priority Data

Jul. 17, 2020 (FR) ..................................... 20 07517

(51) Int. Cl.
*F16D 65/12* (2006.01)
*F16D 65/02* (2006.01)

(52) U.S. Cl.
CPC .......... *F16D 65/124* (2013.01); *F16D 65/128* (2013.01); *F16D 2065/1312* (2013.01); *F16D 2065/1328* (2013.01)

(58) Field of Classification Search
CPC ................. F16D 65/154; F16D 65/128; F16D 2065/1312; F16D 2065/1328
USPC ................. 188/18 A, 218 A, 218 XL, 264 A, 188/264 AA
See application file for complete search history.

(56) References Cited

U.S. PATENT DOCUMENTS

| | | | | |
|---|---|---|---|---|
| 2,330,856 A | * | 10/1943 | Adamson .............. | F16D 13/683 192/70.14 |
| 4,132,294 A | * | 1/1979 | Poli ...................... | F16D 65/128 188/218 XL |
| 4,449,621 A | * | 5/1984 | F'Geppert ............. | F16D 13/648 192/70.14 |
| 5,788,026 A | * | 8/1998 | Poli ...................... | F16D 65/121 188/218 XL |

(Continued)

FOREIGN PATENT DOCUMENTS

| | | | | |
|---|---|---|---|---|
| CN | 108317194 A | * | 7/2018 | .......... F16D 65/124 |
| FR | 2359321 A1 | | 4/1982 | |

(Continued)

OTHER PUBLICATIONS

French Search Report for French Patent Application No. FR20 07517, dated Nov. 10, 2020 in 2 pages.

*Primary Examiner* — Christopher P Schwartz
(74) *Attorney, Agent, or Firm* — Knobbe, Martens, Olson & Bear, LLP

(57) ABSTRACT

A brake disc assembly includes a central drive hub and a wear disc, which includes first and second faces held together axially about the hub. Each face has a respective inner surface and is formed of at least two distinct segments. Each segment extends between two radial edges. The radial edges of the segments of one face do not extend opposite the radial edges of the segments of the other face. Each segment of the face is adapted to be secured to a segment of the other face via at least one fastening member adapted to hold said faces.

14 Claims, 9 Drawing Sheets

(56) References Cited

U.S. PATENT DOCUMENTS

| | | | | |
|---|---|---|---|---|
| 9,791,007 | B2* | 10/2017 | Wurth | F16D 65/122 |
| 10,619,689 | B2* | 4/2020 | Boffelli | F16D 65/128 |
| 11,493,102 | B2* | 11/2022 | Xiao | F16D 65/126 |
| 2004/0084260 | A1* | 5/2004 | Hoyte | F16D 65/12 |
| | | | | 188/218 XL |
| 2012/0090929 | A1* | 4/2012 | Lathwesen | F16D 65/124 |
| | | | | 188/218 XL |
| 2016/0076613 | A1* | 3/2016 | Boffelli | F16D 65/123 |
| | | | | 188/218 XL |
| 2017/0002880 | A1 | 1/2017 | Zenz | |
| 2022/0099150 | A1* | 3/2022 | Boffelli | F16D 65/847 |

FOREIGN PATENT DOCUMENTS

| | | |
|---|---|---|
| WO | 95/30841 A1 | 11/1995 |
| WO | 2015/090890 A1 | 6/2015 |

* cited by examiner

BRAKE DISC ASSEMBLY WITH SEGMENTS

CROSS-REFERENCE TO RELATED APPLICATION

This application claims priority to French Patent Application No. FR 20 07517 filed on Jul. 17, 2020, the disclosure of which including the specification, the drawings, and the claims is hereby incorporated by reference in its entirety.

FIELD OF THE INVENTION

The present invention relates to a brake disc assembly comprising a central drive hub and a wear disc comprising a first face and a second face, the faces being held together axially around the hub, each face having a respective inner surface facing the inner surface of the other face, each face being formed of at least two distinct segments, each segment extending between two radial edges.

The invention further relates to an associated railway vehicle.

BACKGROUND OF THE INVENTION

The document FR 2 359 321 describes a disc brake assembly comprising a central drive hub and two wear rings divided into half-rings. The half-rings are connected by means of screws.

However, as the temperature rises, the assembly expands. As the screws hold the wear rings, the expansion generates thermo-mechanical stresses around the screw.

In addition, the deformation of the rings held together at the screws causes the assembly to move out of alignment, which can lead to malfunctions in the braking system.

SUMMARY OF THE INVENTION

It is therefore an object of the invention to provide a brake disc assembly which avoids de-alignment in the event of temperature change.

To this end, the object of the invention is a brake disc assembly of the aforesaid type in which the radial edges of the segments of one face do not extend opposite the radial edges of the segments of the other face, each face segment being adapted to be secured to a segment of the other face via at least one fastening member adapted to hold said faces together.

The brake disc assembly may furthermore exhibit one or more of the following features, taken in isolation or in any combination that is technically possible:
  each fastening member comprises, for each segment of the face with which it is associated, at least one hook positioned on the inner surface of the said segment and capable of mating with a corresponding hook of a segment of the other face;
  each fastening member comprises a ring extending between the two faces, the ring passing through, parallel to the axis of rotation of the hub, each segment with which it is associated via a respective hole, a ratio between the diameter of the ring, measured at said respective hole, and the diameter of the respective hole being between 90% and 99%, preferably between 95% and 99%;
  each fastening member comprises a screw and a nut, the screw being suitable for passing through a passage hole defined by the ring and for being associated with the nut, the screw comprising a head facing an edge of a hole of one of the segments with which the ring is associated and the nut being positioned facing an edge of the hole of the other segment with which the ring is associated, the nut and the screw being suitable, when they are tightened, for exerting a force on the ring parallel to the axis of rotation of the hub, a ratio between the distance between the head of the screw and the nut, measured parallel to the axis of rotation of the hub, and the distance between the edges of the holes with which the ring is associated is between 101% and 110%, preferably between 104% and 107%;
  the assembly comprises, for each radial edge of each of the segments of each face, at least one fastening member positioned between the said radial edge and a radial edge of another segment of the same face adjacent to the said radial edge;
  each segment comprises at least one hub attachment tab, each attachment tab defining a through attachment hole between the inner surface and the outer surface, wherein each fastening tab has an inner surface and an outer surface, the inner surface of one fastening tab facing an inner surface of an fastening tab of an opposite segment, the fastening holes of mating fastening tabs being aligned, the assembly comprising for each pair of mating fastening holes a fastening device, the fastening device comprising a fastening sleeve provided with two opposite end portions, each suitable for being inserted respectively into one of the fastening holes;
  the end portions and the fastening holes are oblong in shape;
  each segment comprises a central fastening tab and two distal fastening tabs arranged on either side of the central fastening tab, each fastening hole of the central and distal tabs of the same segment having an oblong shape along a respective first longitudinal axis perpendicular to a central axis passing through the said fastening hole, the first longitudinal axis of each fastening hole forming a non-zero angle with respect to the first longitudinal axis of the other fastening holes;
  the maximum length of each of the fastening holes of the distal fastening tabs, measured along the corresponding first longitudinal axis, is between 102% and 108% of the maximum length of the end portions intended to be inserted into the said holes, the end portion forming, with an edge of the fastening hole with which it is associated, a free space on the side of the central fastening tab;
  for each sleeve, each end portion is oblong in shape along a second longitudinal axis perpendicular to a central axis of said sleeve, the longitudinal axes of each end portion forming an angle with each other of between 10° and 70°, preferably between 15° and 25°;
  each fastening member comprises an associated fastening member adapted to be inserted into said sleeve, the hub comprising at least one securing tab extending against a fastening tab, the fastening member comprising a central body adapted to pass through the sleeve and the securing tab and a head extending against the securing wall at one end of the body;
  each face comprises the same predetermined number of segments, each segment having an equal angular extent for all segments of the face, and wherein the angular offset between segments of facing faces is substantially equal to the ratio of the angular extent of one of the segments to the number of segments;

each hook comprises at least one main portion and a shoulder, the shoulder extending in a direction substantially parallel to the local tangential direction of the face from an upper edge of the main portion, the shoulder being separated from the inner surface by the main portion, the hooks of the same face are located on a circle, the shoulders of the hooks being oriented in the same direction on the circle, at least one of the fastening members extends proximate the outer edge of one of the faces, each face comprises three segments each having an angular extent substantially equal to 120°, the angular offset between the radial edges of two facing segments being substantially equal to 40°, the inner surface of each face has ventilation fins, the ventilation fins of the faces corresponding to each other such that the fins of one of the faces overlap with the fins of the other of the faces; and/or the faces are connected to the hub by fastening members, the assembly comprising at least one sleeve for each fastening member between said fastening member and the face(s).

The invention further relates to a railway vehicle comprising a disc brake system comprising a disc assembly as previously described.

BRIEF DESCRIPTION OF THE DRAWINGS

Further features and advantages of the invention will be apparent from the detailed description given below, by way of indication and not in any way limiting, with reference to the appended figures, among which.

DETAILED DESCRIPTION OF THE PREFERRED EMBODIMENTS

Figure 1:
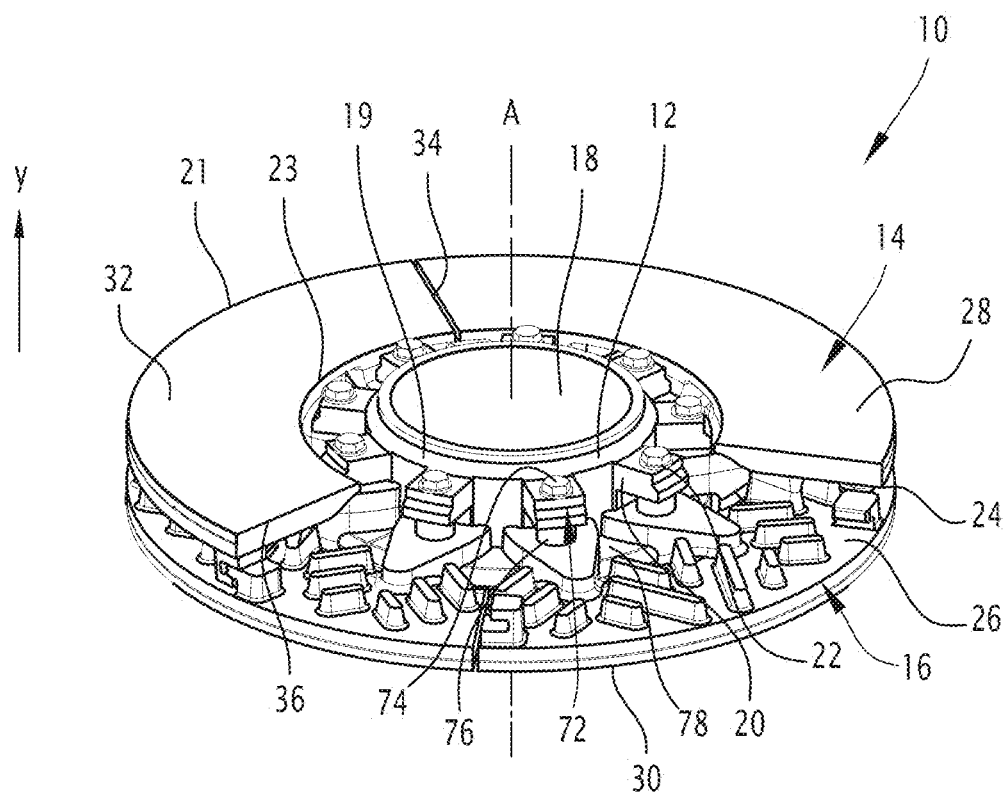
FIG. 1 is a schematic perspective representation of a first embodiment of a disc assembly according to the invention, in which one segment is missing.

A brake disc assembly 10 according to a first embodiment of the invention is shown in FIGS. 1 to 5.

Such a disc assembly 10 is suitable for a disc brake system, for example, included in a railway vehicle. The structure, apart from the disc assembly 10, and operation of such a braking system are known and will not be described in further detail here.

The assembly 10 comprises a central drive hub 12 and a wear disc.

The disc comprises a first face and a second face 14, 16.

The faces 14, 16 are held together axially around the hub 12.

The hub 12 is adapted to be connected to an axle 18 so as to transmit rotation from the axle to the wheel.

The hub 12 comprises, for example, a substantially cylindrical ring extending about an axis extending in a so-called transverse direction Y, hereinafter referred to as the axis of rotation A.

The transverse direction Y is the main direction of the axle.

The hub 12 further has a plurality of securing tabs 20 extending from an outer surface of the ring. Each securing tab 20 extends in a respective radial direction perpendicular to the transverse direction Y. Here, the securing tab 20 extends proximate to a so-called upper edge 19 of the outer surface of the ring along the transverse direction Y.

The securing tabs 20 have a uniform angular distribution around the hub 12, i.e. the angle between adjacent securing tabs 20 is constant.

Each securing tab 20 has a through hole 22, the hole 22 passing through the securing tab 20 in the transverse direction Y. More particularly, the hole 22 is a cylindrical hole with an axis extending along the transverse direction Y.

In particular, the securing tabs 20 are used to secure the faces 14, 16 of the disc to the hub as explained below.

The faces 14, 16 are for example identical.

Each face 14, 16 has an outer edge 21.

Each face 14, 16 has the general shape of a ring extending about the axis of rotation A, so that it also has an inner edge 23 and the inner and outer edges 23, 21 are circles, the diameter of the inner edge 23 being smaller than that of the outer edge 21.

Each face 14, 16 has a respective inner surface 24, 26 and a respective outer surface 28, 30.

The inner surface 24, 26 of the faces 14, 16 face each other.

Each face 14, 16 is formed of at least two, more particularly here three, distinct segments 32.

Each face 14, 16 comprises the same determined number n of segments, here equal to three.

Each segment 32 is made of one piece and is, for example, moulded or obtained by forging.

The segments 32 are made of forged steel, more particularly of steel comprising chromium (Cr) and molybdenum (Mo) and advantageously vanadium (V) so as to raise the superheating temperature, more particularly of steel 28CrMoVa0508.

The segments 32 of the same face 14, 16 are identical here. In the illustrated embodiment, the segments 32 of the two faces of the disc are also identical to each other.

Each segment 32 is a portion of the face 14, 16 cut along radial planes, extending along a radial direction of the face and the transverse direction Y.

Each segment 32 extends between two radial edges 34, 36.

The angular extent a of a segment is defined as the angle formed by the segment 32 between its two radial edges 34, 36.

Each segment 32 has an equal angular extent a for all segments of the same face 14, 16, more particularly for all segments of the first and second faces 14, 16.

Each segment here has an angular extent a substantially equal to 120°, more particularly between 115° and 120°.

The segments 32 of the same face are not contiguous, so that a gap 38 exists between two adjacent segments. This space has a dimension, for example, between 0 mm and 5 mm. In particular, this space allows for a small amount of clearance between the segments and possibly for expansion of the segments in this area, for example, due to an increase in temperature.

All of the segments 32 of a face form a continuous ring except for the spaces 38 between the segments.

The radial edges 34, 36 of the segments of the first face 14 do not extend opposite the radial edges of the segments of the second face 16, i.e. the segments of one face are angularly offset from the segments of the other face.

The angular offset θ between the radial edges of two opposing face segments is defined as the minimum angle between said radial edges. We define the angular offset θ between two opposite face segments as the minimum angular offset between the radial edges of the two segments.

In this case, the angular offset θ between facing segments 32 is equal to a divided by n, i.e.

$$\frac{\alpha}{n},$$

α being the angular extent of a segment and n being the number of segments per face.

In the example shown, the angular offset θ between the edges of two facing segments 32 is substantially equal to 40°, give or take the space 38.

The angular offset makes it possible to have mechanical continuity of the assembly formed by the two faces. Indeed, if the two faces had segments with radial edges aligned along the transverse direction Y then a plane comprising the spaces between the faces would represent a plane of mechanical weakness of the disc assembly.

Each segment 32 of the face is adapted to be secured to a segment of the other face via at least one fastening member adapted to hold said faces 14, 16.

More particularly herein, each segment 32 comprises on the inner surface 26 of the face at least one hook 40, 42, more particularly herein two hooks 40, 42 per segment 32.

Each hook is adapted to mate with a corresponding hook on the other face to hold said faces 14, 16 together.

Each fastening member in this case comprises, for each segment 32 of the face with which it is associated, at least one hook 40, 42 positioned on the inner surface 24, 26 of the said segment 32 and capable of mating with a corresponding hook 40, 42 of a segment 32 of the other face 14, 16.

Each hook 40, 42 extends proximate to the outer edge 30 of one of the faces 14, 16, more particularly at a distance less than 7.0 mm from the edge 21.

The hooks 40, 42 of a given face 14, 16 are located on the same circle, the circle here being coaxial with the face.

Each hook 40, 42 comprises at least one main portion 44, 46 and a shoulder 48, 50. The main portion 44, 46 extends from the inner surface 24, 26. The shoulder 48, 50 extends from an upper edge of the main portion 44, 46, the shoulder being separated from the inner surface 26 by the main portion 44, 46.

The shoulder 48, 50 extends in a direction substantially perpendicular to the local radial direction of the face 14, 16. The shoulders 48, 50 of the hooks 40, 42 of the same face are oriented in the same direction on the circle.

The shoulder 48, 50 is shaped like a block.

Figure 5:
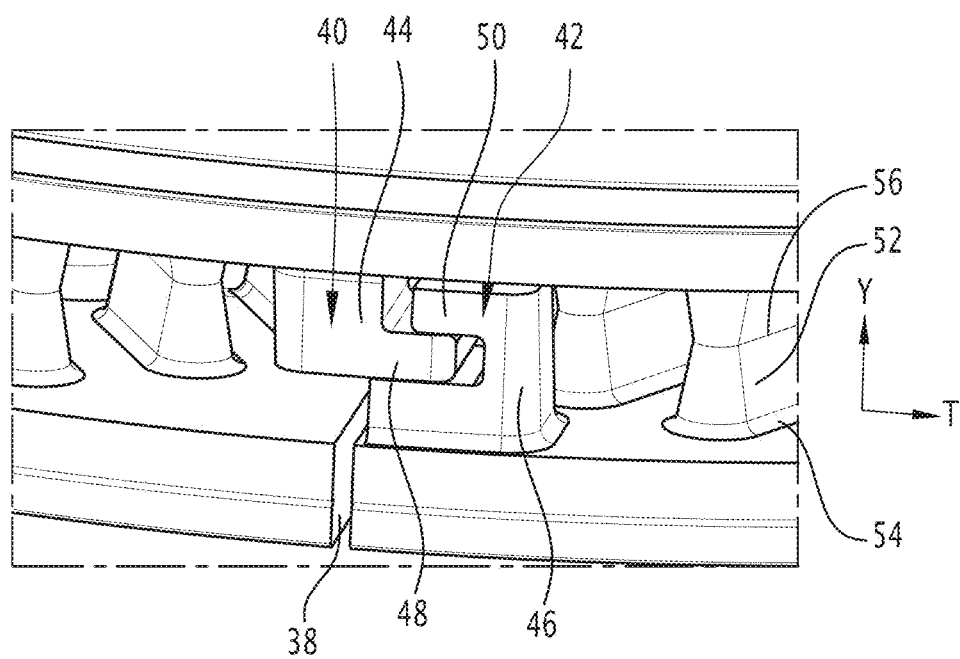
FIG. 5 is a schematic representation in perspective view of a detail of hooks of the assembly of FIG. 1.
Figure 6:
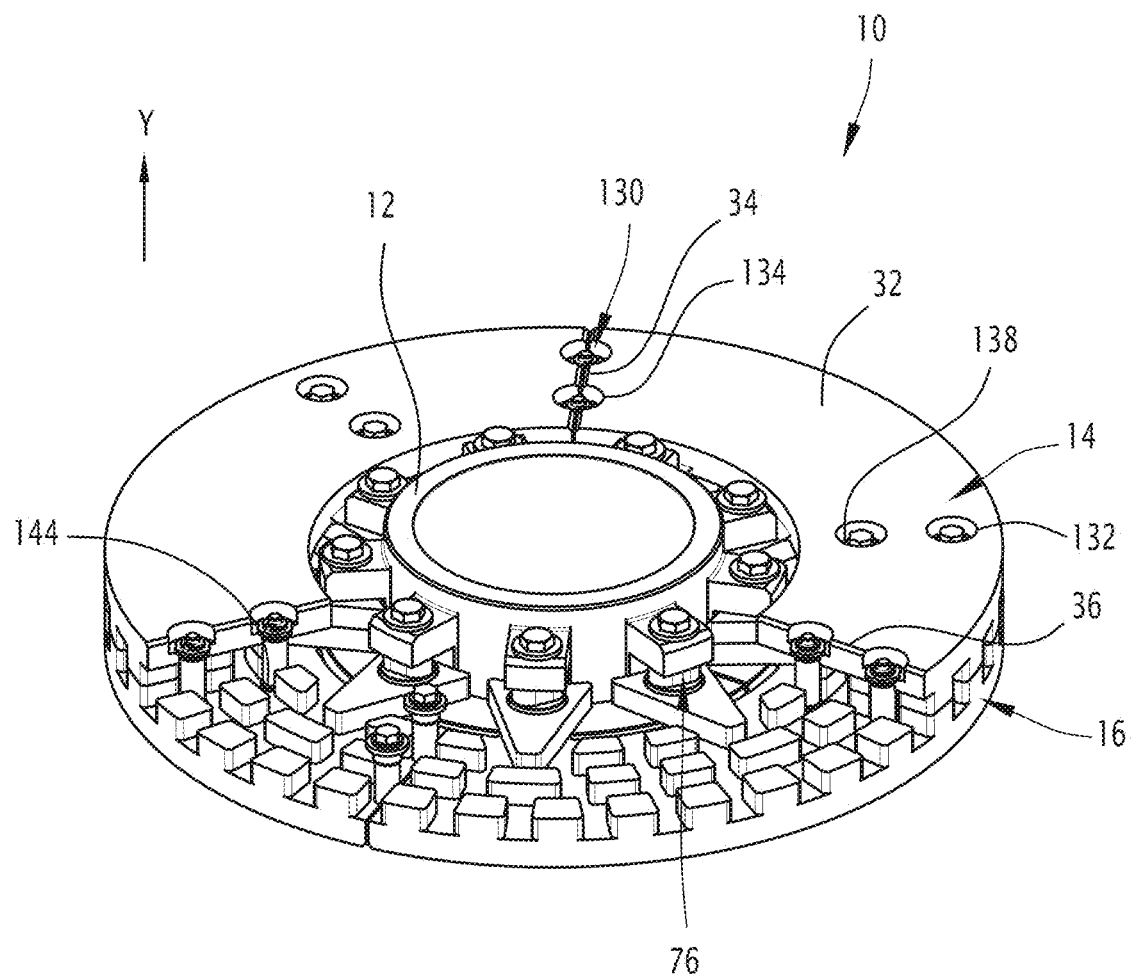
FIG. 6 is a schematic perspective representation of a second embodiment of a disc assembly according to the invention, in which one segment is missing.
Figure 7:
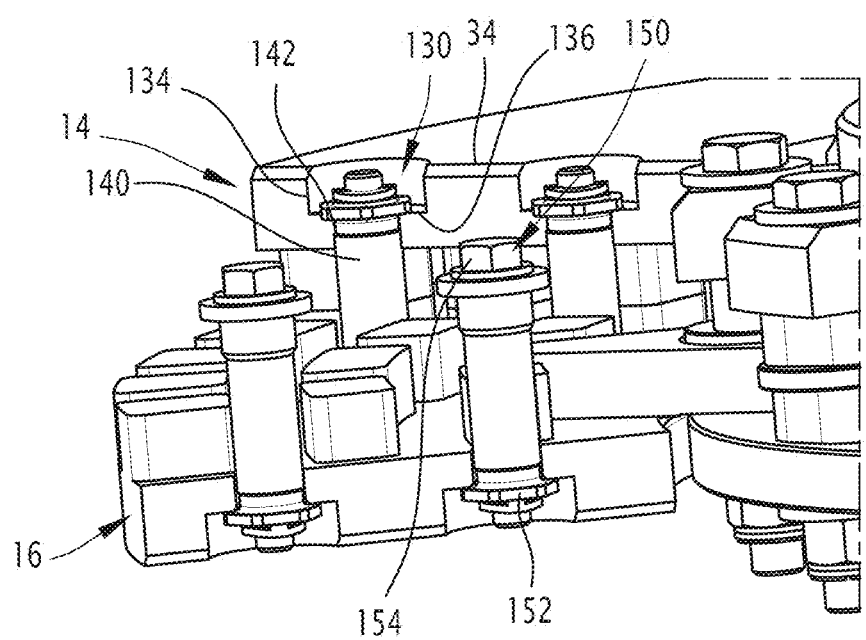
FIG. 7 is a schematic perspective view of the assembly of FIG. 6, in which two segments are missing.
Figure 8:
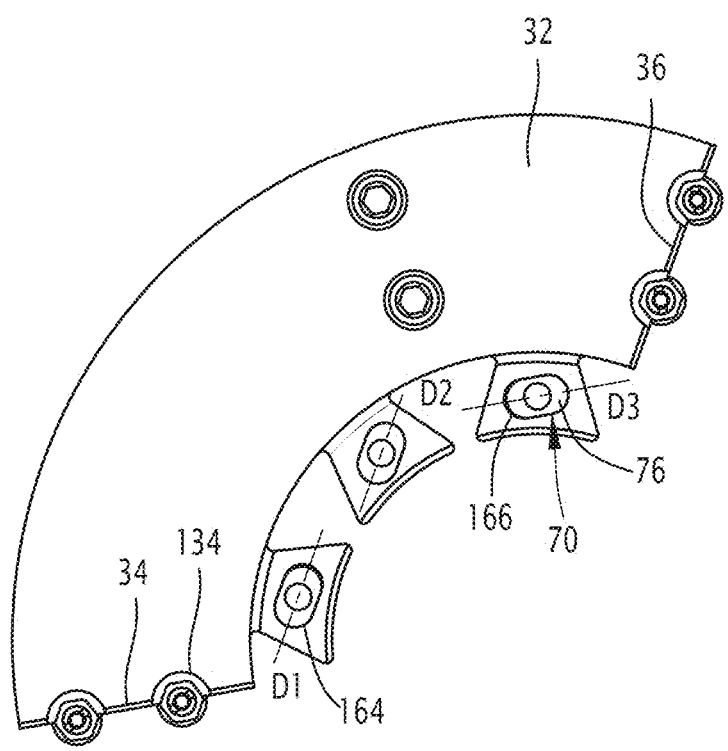
FIG. 8 is a schematic top view of a segment of the assembly of FIG. 6, and of corresponding sleeves and fastening members.
Figure 9:
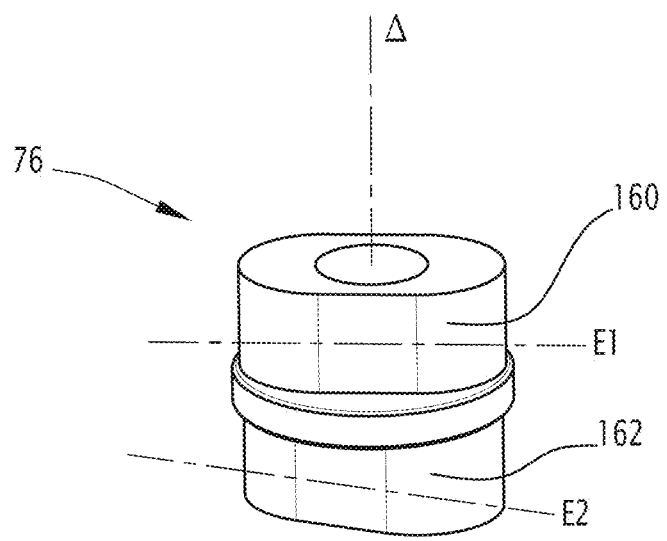
FIG. 9 is a schematic representation in perspective view of a sleeve of the assembly of FIG. 6.

The hook 40, 42 may be in one of two different shapes: a first shape and a second shape. A hook according to the first shape is here adapted to mate with a hook according to the second shape, as seen in FIG. 5.

More particularly, each segment 32 has a first hook 40 of the first shape and a second hook 42 of the second shape, such that the hooks of the first and second shapes alternate on the face so that they can mate with the hooks of the first and second shapes of the other face.

In a hook 40 having the first shape, the main portion 44 has the shape of a rectangular block. The hook 40 is thus L-shaped, with a first leg formed by the main portion 44 and a second leg formed by the shoulder 48. The shoulder 48 extends opposite the inner surface.

In a hook 42 having the second shape, the main portion 46 has the form of an L-shaped block with a first leg extending against the inner surface of the disk and a second leg extending perpendicular to said inner surface. The general shape of the hook is thus a U with sides that may have different dimensions. The shoulder 50 faces the first leg of the main portion 46.

The shoulder 48, 50 of a hook 40, 42 is received between the shoulder 50, 48 of the corresponding hook 42, 40 and the disc of the corresponding hook 42, 40.

More particularly, the shoulder 50 of a hook 42 having the second shape is received between the shoulder 48 of the corresponding hook 40 having the first shape and the inner surface of the face comprising the hook 40 having the first shape. The dimension of the shoulder 50 of a hook 42 having the second shape in the transverse direction Y is strictly greater than the distance between the shoulder 48 of a hook 40 having the first shape at the inner surface.

The shoulder 48 of a hook 40 of the first shape is received between the shoulder 50 and the first leg of the main portion 46 of the corresponding hook 42, having the second shape. The dimension of the shoulder 48 of a hook 40 having the first shape in the transverse direction Y is substantially equal to the distance between the shoulder 50 and the first leg of the main portion 46 of a hook 42 having the second shape, i.e. here between said distance and said distance increased by 5%. There is, for example, a clearance between the shoulder 48 of the hook 40 and the hook 42, here between 0.1 and 0.2 mm.

In particular, this allows the faces to be held together in the transverse direction Y, so as to form the wear disc.

In particular, the hook shape allows a clearance in a plane perpendicular to the axis A of the connecting means of the two faces 14, 16.

In particular, in the illustrated example, there is a clearance in the tangential direction T, i.e. perpendicular to the radial direction and the transverse direction Y, between the shoulder of a hook and the corresponding hook at said shoulder.

The inner surface 24, 26 of each face 14, 16 also has ventilation fins 52.

The ventilation fins 52 of the faces 14, 16 correspond such that the fins of one of the faces 14 overlap with the fins of the other of the faces 16.

More particularly, each fin 52 has a shape identical to the corresponding fin.

The ventilation fins are elongated such that they each define a respective main direction in the plane perpendicular to the transverse direction Y.

Each fin 52 extends in the Y direction between a base 54 at the inner surface 24, 26 and an apex 56 facing the inner surface 24, 26 of the opposite face.

All the fins 52 of a face have the same dimension in the transverse direction Y such that the vertices 56 of the fins 52 of the same face extend substantially in the same plane.

The fins 52 facing each other on the two adjacent faces 24 and 26 are in contact over their entire respective vertex 56.

The base 54 and the vertex 56 each have an oblong shape, the vertex 56 here being included in the projection of the base along the transverse direction Y, i.e. the vertex 56 has a smaller area than the base.

In particular, the surface area of the fin gradually decreases from the base to the vertex. In other words, the fin 52 has a decreasing cross-sectional size from the base 54 to the vertex 56.

In the example shown, each section of the fin 52 in a plane perpendicular to the transverse direction Y has a central portion 58 and two end portions 60, 62 on either side of the central portion 58, the central portion 58 being a rectangle and the two end portions 60, 62 forming semicircles having one of the sides of the rectangle as a diameter. The diameter of the semicircles decreases strictly from the base 54 to the vertex 56. The sides of the rectangle not forming the diameters of the semicircles have a constant dimension from the base 54 to the vertex 56.

The shape of the fins allows an optimal cooling of the disc while favouring contact between the different sectors of the disc faces to ensure its mechanical strength.

The fins 52 of a single segment are distributed on the inner surface 24, 26 in rows along the radial direction of the disc. The fins 52 in a row are parallel to each other.

The main direction, taken in the plane perpendicular to the transverse direction Y, of the fins 52 has an angle of between −55° and +55° with respect to the local radial direction, more particularly an angle equal to +35° or −35°, +45° or −45° or +55° or −55°.

Here, the fins 52 of one row have an angle with respect to the respective radial direction opposite that of the fins 52 of each of the adjacent rows. Between two adjacent rows, there is a radial axis such that the main direction of the vanes of one of the two rows is symmetrical to the main direction of the vanes of the other of the two rows with respect to said radial axis.

Such a distribution of fins allows symmetries in the distribution and a reduction of the energy consumption due to ventilation.

Each segment 32 comprises at least one fastening tab 64, more particularly here three fastening tabs, at the inner edge 23.

Figure 2:
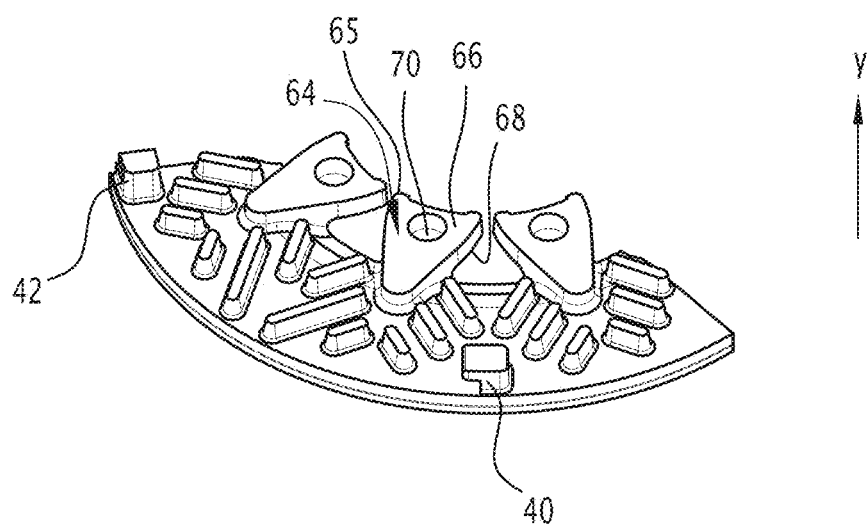
FIG. 2 is a schematic representation in perspective view of the segment missing from FIG. 1.
Figure 3:
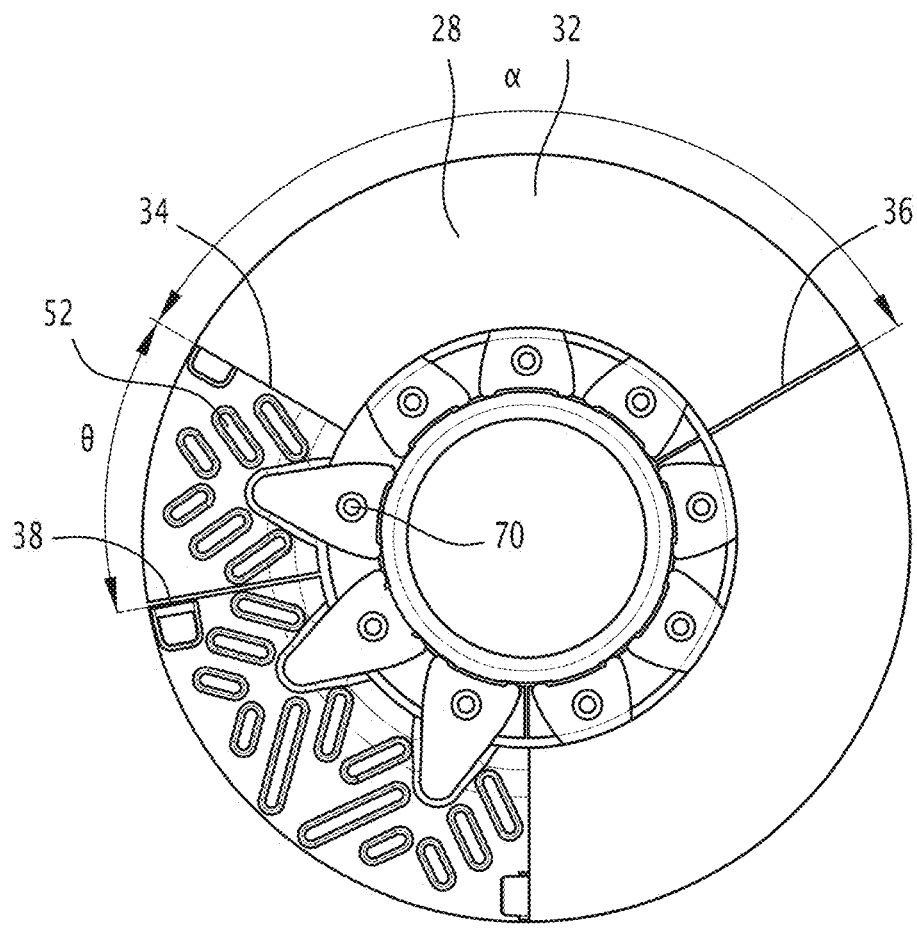
FIG. 3 is a top view of the assembly of FIG. 1.
Figure 4:
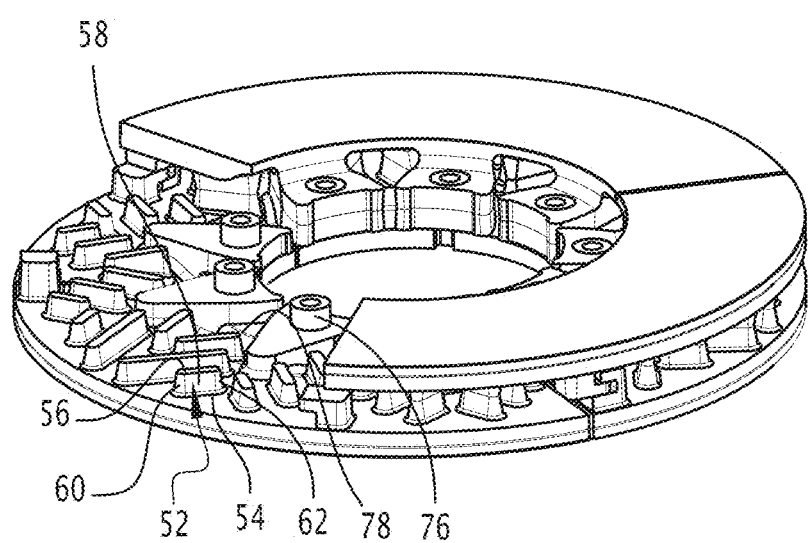
FIG. 4 is a schematic representation in perspective view of the assembly of FIG. 1 without the hub and fastening members.

Specifically, each segment 32 includes a central fastening tab and two distal fastening tabs disposed on either side of the central fastening tab, as shown in FIG. 2.

The segments 32 forming a face have as many fastening tabs 64 as the hub 12 has securing tabs 20.

The fastening tabs 64 of a segment 32 have a uniform angular distribution along the inner edge 23 of the segment.

Each fastening tab 64 extends partially outside the ring shape of the face, within the space defined by said ring. More particularly, between 40% and 60% of the maximum dimension of the fastening tab 64 in the local radial direction is attached to the inner surface in the ring shape and between 40% and 60% of said dimension is outside the ring shape.

Each fastening tab 64 contacts the hub 12 at an inner edge 65. This makes it possible to centre the various sectors of the disc in order to facilitate the assembly and the balancing of the whole.

In the example shown, each fastening tab 64 has a substantially triangular shape along the plane perpendicular to the transverse direction Y, one vertex of which is on the ring, the side of the triangle opposite said vertex being the inner edge 65 in contact with the hub 12.

Each fastening tab 64 is adapted to mate with a fastening tab of an opposite segment.

Each fastening tab 64 has an inner surface 66 and an outer surface 68, with the inner surface 66 of one fastening tab 64 facing an inner surface of a fastening tab of an opposite segment.

More particularly, the inner surface 66 of each fastening tab 64 contacts the inner surface of the tab with which it mates from the opposite segment.

Each fastening tab 64 here has a dimension along the transverse direction Y such that its inner surface 66 is in a same plane as the top 56 of the fins 52 of the segment 32.

The portion of the fastening tab 64 outside the ring defines a fastening through-hole 70 between the inner surface 66 and the outer surface 68. Here, the fastening hole 70 extends along the transverse direction Y.

The fastening holes 70 have dimensions perpendicular to the transverse direction Y which are strictly greater than the holes 22 of the securing tabs 20 of the hub 12.

The fastening holes 70 of mating fastening tabs 64 are aligned.

The tabs 64 have a distribution such that each fastening tab 64 of a segment 32 is aligned with a securing tab 20 of the hub 12, and vice versa.

The assembly 10 further comprises a fastening device 72 for connecting the faces 14, 16 to the hub 12.

The fastening device 72 comprises at least one, herein a plurality, of fastening elements 74, at least one, herein a plurality, of sleeves 76 and advantageously a fastening washer 78.

The fastening washer 78 has the general shape of a ring having an outer diameter substantially equal to the inner diameter of the second face 16.

The radial dimension of the fastening washer 78 is equal to the maximum radial dimension of the fastening tabs 64 of the second face 16 outside the ring.

The fastening washer 78 includes a plurality of segments, more particularly as many segments as the second face 16 has segments.

Each segment of the fastening washer 78 mates with a segment 32 of the corresponding second face 16. More particularly, the outer diameter of the segment of the fastening washer 78 extends against the inner edge 23 of the segment 32 of the second face 16 over the angular extent of the segment.

The fastening washer 78 thus extends in continuity with the ring of the second face 16 into the interior of said ring.

The fastening washer 78 extends against the outer surface 68 of the fastening tabs 64.

Each segment of the fastening washer 78 defines as many through holes along the transverse direction Y as the second face 16 comprises fastening tabs 64. The through holes in the mounting washer 78 are aligned in the transverse direction Y with the fastening holes 70 in the fastening tabs 64.

The fastening washer holes 78 have dimensions perpendicular to the transverse direction Y which are strictly greater than the holes 22 of the securing tabs 20 of the hub 12.

The washers are used to take up centrifugal forces in order to relieve the fasteners. In addition, they allow the faces of the disc to be joined together.

Each fastening member 74 comprises, for example, a screw or bolt or dowel or pin. This allows for ease of assembly, compared to fastening members such as a press. In the event of wear of one or more segments, it is thus easy to replace the segment(s) concerned by simply removing the fastening elements 74, without this also requiring the hub to be separated from the axle.

Each fastening member 74 passes through a securing tab 20 of the hub 12 via the through hole 22, the corresponding fastening tabs 64 of the segments 32 of each of the first face 12 and the second face 14 via the fastening holes 70 and, if applicable, the corresponding hole of the fastening washer 78. The fastening member 74 extends mainly along the main direction of said holes 22, 70, i.e., here along the transverse direction Y.

The dimensions of the fastening tabs 64 and the securing tabs 20 are such that the securing tab 20 of the hub 12 is contact with the corresponding fastening tab 64 of the first face 14, the first face 14 being in contact with the second face 16 at the respective fastening tabs 64.

The fastening member 74 includes, in the illustrated example, a head and a central body.

The central body is adapted to pass through the fastening tab 64 and the securing tab 20.

The central body passes through the holes 22, 70.

The head extends against the securing tab 20 of the hub 12 at one end of the body.

The diameter of the fastening member 74 is such that a gap is present between the fastening member 74 and the edges of the holes 22, 70 through which it passes.

In the illustrated example, the fastening member 72 includes a sleeve 76 for each fastening member 74.

The sleeve 76 surrounds the respective fastening member 74.

More particularly, said sleeve 76 extends into the space between the fastening member 74 and the edges of the fastening holes 70 of the fastening tabs through which said fastening member 74 passes, more particularly axially between the securing tab 20 and the fastening washer 78.

Here, the central body of the fastening member 74 is adapted to pass through the sleeve 76 and the securing tab 20.

Each sleeve 76 is here provided with two opposing end portions. Each end portion is adapted to be inserted into one of the fastening holes 70 of an associated fastening tab 64.

The diameter of the fastening hole 70 of said fastening tab 64 is between 100% and 108% of the diameter of the end portion to be inserted into said hole.

The sleeves 76 are made of steel, more particularly hard steel comprising chromium and molybdenum, more particularly steel 42CrMo4.

Alternatively, the fastening member 72 comprises a plurality of sleeves around at least one of the fastening members, the sleeves being arranged in sequence along the fastening member in the transverse direction Y.

In particular, the use of sleeves 76 ensures the freedom of the segments and reduces the stresses applied to the fastening elements 74, allowing in particular the use of fastening members of the screw, bolt, stud or dowel type.

The holding of the disc faces by hooks allows a certain freedom of deformation on the plane perpendicular to the axis A.

A brake disc assembly 10 according to a second embodiment of the invention will now be described with reference to FIGS. 6 to 9.

Only those features in which the second embodiment differs from the first embodiment will be described below. Similar or identical features will be referenced in the following with the same numerical reference.

In the second embodiment shown, the inner surface of the segments is devoid of a hook as described with respect to the previous embodiment.

Each segment 32 defines holes 130, 132 for receiving fastening members.

Each segment 32 comprises, on each radial edge 34, 36, at least one cutout 134, more particularly here two cutouts on each radial edge 34, 36.

The cutouts 134 in adjacent radial edges of adjacent segments 32 of a single face 14, 16 are aligned so that together they define at least one opening 130 between the two corresponding segments 32.

The at least one hole 130 extends through the corresponding face 14, 16 along the transverse direction Y.

Here, the hole 130 has a bore so as to define a shoulder 136 on the outer surface side.

Each segment 32 further defines at least one through-hole 132 arranged opposite radial edges of the opposing segments along the transverse direction Y. More particularly herein, each segment 32 defines two through-holes 132 opposite an interface between two radial edges.

Each through-hole 132 extends along the transverse direction Y.

Each through-hole 132 of a segment 32 is aligned, along the transverse direction Y, with a hole 130 bounded by the corresponding cutouts 134.

Here, the hole 132 has a bore so as to define a shoulder 138 on the outer surface side.

The disc assembly 10 comprises, for each radial edge 34, 36 of each of the segments 32 of each face 14, 16, at least one fastening member positioned between said radial edge and a radial edge of another segment of the same face adjacent to said radial edge.

In the example shown, each radial edge 34, 36 of each of the segments 32 of the faces 14, 16 mates with two fastening members. Each fastening member extends between two adjacent radial edges.

Each fastening member comprises a ring 140 extending between the two faces 14, 16, more particularly along the transverse direction Y.

The ring 140 extends between a first end 142 and a second end 144 along the transverse direction Y.

At the first end 142, the ring 140 passes, here at least partially, through one of the two faces 14 at the interface between two radial edges 34, 36 of adjacent segments 32 of the face 14, more particularly at one of the holes 130 delimited by the cutouts 134 of the radial edges.

At the second end 144, the ring 140 passes, here at least partially, through the other of the two faces 16 at a segment 32, more particularly at one of the holes 132.

A ratio of the diameter of the ring 140, measured at each of the holes 132, 130 that it passes through, to the diameter of the respective hole 132, 130 at the ring 140 is between 90% and 99%, preferably between 95% and 99%.

The clearance between the ring 140 and each of the respective holes 132, 134 allows some freedom of deformation in the plane perpendicular to the transverse direction Y. Thus, in the event of a change in temperature, the stresses exerted and the deformation are limited.

The ring 140 defines a through-hole.

More particularly, the through-hole has a cylindrical shape with a major axis along the transverse Y direction.

Each fastening member further comprises a screw 150 and a nut 152.

The screw 150 and the nut 152 are adapted to mate.

The screw 150 passes through the through-hole defined by the ring 140.

The screw 150 includes a head 154 facing an edge of a hole 130, 132 of one of the segments with which the ring 140 is associated. More particularly, the head 154 here extends against the corresponding shoulder 136, 138.

The nut 152 is positioned opposite an edge of the hole 130, 132 of the other segment with which the ring 140 is associated. More particularly, the nut 152 here extends against the corresponding shoulder 136, 138.

The nut 150 and the screw 152 are suitable, when tightened, to exert a force on the ring 140 in the transverse direction Y.

A ratio between the distance between the screw head and the nut measured in the transverse direction Y and the distance between the edges of the holes with which the ring is associated is between 101% and 110%, preferably between 104% and 107%

In particular, this allows each fastening member to have clearance in the transverse direction Y.

Furthermore, in the second embodiment shown, the sleeves 76 differ from those described in the first embodiment.

However, the facing sleeves 76 of the second embodiment could be similar to those of the first embodiment, and the assembly described in the first embodiment could be adapted with sleeves as they will be described in the second embodiment.

More particularly, in the second embodiment shown, the end portions 160, 162 of each of the sleeves 76 and the fastening holes 70 are oblong in shape.

More particularly, each fastening hole 70 of the central and distal tabs of a single segment 32 have an oblong shape along a respective first longitudinal axis $D_1$, $D_2$, $D_3$. Each of the first longitudinal axes $D_1$, $D_2$, $D_3$ is perpendicular to the central axis passing through said fastening hole 70. More particularly, each of the first longitudinal axes $D_1$, $D_2$, $D_3$ is perpendicular to the transverse direction Y.

The first longitudinal axis $D_1$, $D_2$, $D_3$ of each fastening hole 70 preferably forms a non-zero angle, for example between 10° and 170°, with respect to the first longitudinal axis $D_1$, $D_2$, $D_3$ of the other fastening holes 70, at least within a same segment 32.

The maximum length of each of the fastening holes 70 of the distal fastening tabs measured along the corresponding first longitudinal axis $D_1$, $D_3$ is between 102% and 108% of the maximum length of the end portions 160, 162 intended to be inserted into said holes.

The end portion 160, 162 forms, with an edge of the fastening hole 70 into which it extends, a free space 164, 166.

The free space 164, 166 extends from the side of the central fastening tab. More particularly, the free space 164, 166 extends to the end of the fastening hole 70 along the corresponding first longitudinal axis $D_1$, $D_3$ closest to the central fastening tab.

For each sleeve 76, each end portion 160, 162 is elongated along a respective second longitudinal axis $E_1$, $E_2$. The second longitudinal axes $E_1$, $E_2$ are perpendicular to a central axis Δ of said sleeve 76.

The central axis Δ of the sleeve 76 corresponds substantially to the main axis of the fastening member 74.

The central axis Δ of the sleeve 76 extends along the transverse direction Y.

The maximum length of an end portion 160, 162 is measured along its respective second longitudinal axis.

The second longitudinal axes $E_1$, $E_2$ of the end portions 160, 162 of the same sleeve 76 form an angle with each other of between 10° and 70°, preferably between 15° and 25°.

The orientations E1, E2 are, for example, defined to be in the direction of expansion of the sectors.

Since the faces of the disc have segments offset between the faces, for example by 40°, the directions of expansion between these two faces are here not the same at the location of positioning of each sleeve, and thus at the end portions 160, 162 of a single sleeve 76.

The shape of the sleeve makes it possible for the entire disk to be made of a single piece, whatever the limit conditions required, and thus to have fewer part numbers.

In an alternative embodiment, the disk assembly comprises fastening members according to the first embodiment and fastening members according to the second embodiment.

The presence of clearance in the holding of the faces of the disc, by the hooks and/or by the presence of empty spaces around the elements composing the fastening members, allows a certain freedom of deformation, in particular on the plane perpendicular to the transverse direction. Thus, in the event of a change in temperature, when the faces expand, the stresses exerted and the deflection are limited. This ensures the flatness of the disc. Going out of alignment can lead to accelerated wear of the disc. Thus, a disc assembly according to the described embodiments helps to limit the wear of the disc.

What is claimed is:

1. A brake disc assembly comprising a central drive hub and a wear disc comprising first and second faces, the faces being held together axially around the hub, each face having a respective inner surface facing the inner surface of the other face, each face being formed of at least two distinct segments, each segment extending between two radial edges,
   the radial edges of the segments of one face not extending opposite the radial edges of the segments of the other face, each face segment being adapted to be secured to a segment of the other face via at least one fastening member adapted to hold said faces,
   wherein each face comprises the same predetermined number (n) of segments, each segment having an equal angular extent (α) for all segments of the face, and wherein the angular offset (θ) between segments of facing faces is substantially equal to the angular extent divided by the predetermined number of segments,
   wherein each segment comprises at least one fastening tab at the hub, each fastening tab defining a fastening through-hole between the inner surface and the outer surface,
   wherein each fastening tab has an inner surface and an outer surface, with the inner surface of one fastening tab facing an inner surface of a fastening tab of an opposite segment,
   the fastening holes of mating fastening tabs being aligned,
   the assembly comprising, for each pair of fastening holes mating with each other, a fastening device, the fastening device comprising a fastening sleeve provided with two opposite end portions, each suitable for being inserted respectively in one of the fastening holes.

2. The brake disc assembly according to claim 1, wherein each fastening member comprises a ring extending between the two faces, the ring passing, parallel to the axis of rotation of the hub, through each segment with which it is associated via a respective hole, a ratio between the diameter of the ring, measured at said respective hole, and the diameter of the respective hole being between 90% and 99%.

3. The brake disc assembly according to claim 2, wherein each fastening member comprises a screw and a nut, the screw passing through a passage hole defined by the ring and being associated with the nut, the screw comprising a head facing an edge of a hole of one of the segments with which the ring is associated, the nut being positioned facing an edge of the hole of the other segment with which the ring is associated, the nut and the screw being suitable, when tightened, for exerting a force on the ring parallel to the axis of rotation of the hub, a ratio between the distance between the head of the screw and the nut measured parallel to the axis of rotation of the hub and the distance between the edges of the holes with which the ring is associated is between 101% and 110%.

4. The brake disc assembly according to claim 3, wherein the ratio between the distance between the head of the screw and the nut measured parallel to the axis of rotation of the hub and the distance between the edges of the holes with which the ring is associated is between 104% and 107%.

5. The brake disc assembly according to claim 2, wherein the ratio between the diameter of the ring, measured at said respective hole, and the diameter of the respective hole is between 95% and 99%.

6. The brake disc assembly according to claim 2, comprising, for each radial edge of each of the segments of each face, at least one fastening member positioned between said radial edge and a radial edge of another segment of the same face adjacent to said radial edge.

7. The brake disc assembly according to claim 1, wherein each segment comprises a central fastening tab and two distal fastening tabs disposed on either side of the central fastening tab, each fastening hole of the central and distal fastening tabs of a same segment having an oblong shape along a respective first longitudinal axis perpendicular to a central axis passing through said fastening hole, the first longitudinal axis of each fastening hole forming a non-zero angle with respect to the first longitudinal axis of the other fastening holes.

8. The brake disc assembly according to claim 7, in which the maximum length of each of the fastening holes of the distal fastening tabs measured along the corresponding first longitudinal axis ($D_1$, $D_3$) is between 102% and 108% of the maximum length of the end portions intended to be inserted in the said holes, the said end portion forming, with an edge of the fastening hole with which it is associated, a free space on the side of the central fastening tab.

9. The brake disc assembly according to claim 1, wherein, for each sleeve, each end portion is oblong in shape along a second longitudinal axis ($E_1$, $E_2$) perpendicular to a central axis ($\Delta$) of said sleeve, the second longitudinal axes ($E_1$, $E_2$) of the end portions of a same sleeve forming with each other an angle comprised between 10° and 70°.

10. The brake disc assembly according to claim 9, wherein the angle formed by the second longitudinal axes ($E_1$, $E_2$) of the end portions of a same sleeve with each other is comprised between 15° and 25°.

11. The brake disc assembly according to claim 1, wherein each fastening member comprises, for each segment of the face with which it is associated, at least one hook positioned on the inner surface of the said segment and capable of mating with a corresponding hook of a segment of the other face.

12. The brake disc assembly according to claim 1, wherein the end portions and the fastening holes are oblong in shape.

13. The brake disc assembly according to claim 1, wherein each fastening member comprises an associated fastening member insertable into said sleeve, the hub comprising at least one securing tab extending against at least one fastening member tab, the fastening member comprising:
a central body adapted to pass through the sleeve and the securing tab, and a head extending against the securing tab at one end of the body.

14. A railway vehicle comprising a disc brake system comprising a brake disc assembly according to claim 1.

* * * * *